United States Patent Office 3,565,905
Patented Feb. 23, 1971

3,565,905
DERIVATIVES OF 5-CYCLOALKANESPIRO OXAZOLIDINES
Jacques Georges Maillard, Paris, France, assignor to Laboratories Jacques Logeais, Issy-les-Moulineaux, France, a French body corporate
No Drawing. Filed June 5, 1968, Ser. No. 734,522
Claims priority, application Great Britain, June 13, 1967, 27,238/67
Int. Cl. C07d 85/26
U.S. Cl. 260—294.7
11 Claims

ABSTRACT OF THE DISCLOSURE 5-cycloalkanespiro oxazolidines of the formula

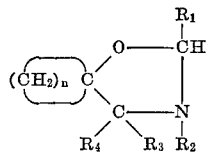

wherein $n$ is 4, 5 or 6, $R_1$ is benzyl, phenyl or phenyl substituted with halogen, hydroxy, nitro, amino, lower alkylamino, methylendioxy or lower alkoxy, are valuable coronary dilators.

---

The present invention relates to new 5-cycloalkanespirooxazolidine derivatives and to the process for preparing same.

The new compounds according to the invention are characterized in that they have the formula:

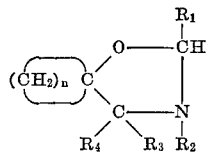
(I)

wherein $n$ is an integer equal to 4, 5 or 6; $R_1$ is a straight chain or branched alkyl radical, a cycloalkyl radical, an aryl radical (optionally substituted with one or two substituents such as halogen, hydroxy, alkyl, alkoxy, nitro, amino, alkylamino or —O—CH$_2$—O), an aralkyl radical (optionally nuclearly substituted with one of the aforesaid substituents), a furyl radical or a thienyl or pyridyl radical; $R_2$ is a straight chain or branched alkyl radical or an aralkyl radical (optionally nuclearly substituted with one of the aforesaid substituents); $R_3$ is a straight chain or branched alkyl radical, an arly radical (optionally substituted by a halogen atom or an alkyl, alkoxy or N(CH$_3$)$_2$) group, or $R_3$ together with $R_2$, the carbon atom carrying $R_3$ and N forms a saturated ring having 4 or 5 carbon atoms; $R_4$ is H or a lower alkyl group.

The invention also includes the acid addition salts of compounds of Formula I and in particular the hydrochlorides.

The new compounds and salts thereof have useful therapeutic properties. They have in particular coronary vasodilating properties which are of particular value therapeutically for the treatment of myocardial infarction and of angina pectoris. In particular, compounds I in which $R_1$ is a substituted radical, especially with a methoxy substituent, were found to be most active.

It was also found advantageous to use compounds I in which one at least of the following requirements is satisfied: $n$ is 5, $R_2$ is alkyl, $R_3$ is alkyl and $R_4$ is hydrogen, it being understood that all such reqirements may be realized simultaneously.

The invention includes also within its scope a process for the preparation of compounds I comprising reacting an aldehyde of formula $R_1$CHO with an amine of Formula II:

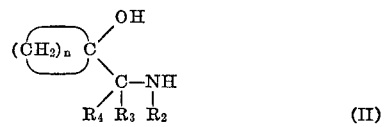
(II)

$n$, $R_1$, $R_2$, $R_3$ and $R_4$ having the above-defined meanings.

Amines of Formula II are obtained by alkylation (or aralkylation) of the corresponding primary amines ($R_2$=H), which are themselves prepared by the method described by I. Elphimoff-Felkin (Bull. Soc. Chim. 1955–784), or by Hoffmann reaction of amides of Formula III (J. Maillard et Coll. Bull. Soc. Chim. 1966–1683):

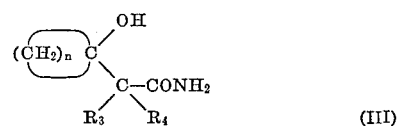
(III)

The reaction is preferably carried out under refluxing conditions in an anhydrous solvent such as benzene, toluene, the water formed being removed by means of a dehydrating agent such as Drierite or p-toluene sulfonic acid, for example.

On completion of the reaction, the desired product may be separated from the reaction medium by evaporating the solvent under reduced pressure. The product may be purified with ether.

Several non limiting examples of the preparation of compounds according to the invention are given below.

EXAMPLE 1

$n=5$, $R_1=C_6H_5$, $R_2=R_3=C_2H_5$, $R_4=H$ 3,4-diethyl-2-phenyl-5-cyclohexylspiro-oxazolidine 9.3 g. of N-ethyl-1-(1 - hydroxy-cyclohexyl) - propylamine and 21.2 g. of benzaldehyde are dissolved in 80 ml. of toluene and the solution is heated to boiling, the water formed by the reaction being removed by entrainment with the toluene vapours. After 18 hours of heating, the solution is filtered and distilled.

9.25 g. (67.5%) of the desired product are collected. B.P.$_{0.03}$=122–123° C. N percent calculated: 5.13. Found: 5.12.

EXAMPLE 2

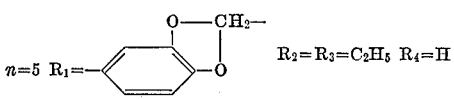

3,4-diethyl-2-(3,4 - methylenedioxy - phenyl)-5-cyclohexylspiro-oxazolidine

This is obtained in the same manner as the product of Example 1 from 9.3 g. of N-ethyl-1(1-hydroxy-cyclohexyl)-propylamine and 15 g. of 3,4-methylenedioxy-benzaldehyde.

After heating during 48 hours, the solution is concentrated under reduced pressure, the residue is redissolved in ether and is then extracted with 2.5 N HCl. The hydrochloride of the desired product precipitates slowly from the hydrochloric solution: it is recrystallized from an isopropanol-ether mixture. Weight, 6.8 g. M.P.=163–165° C.

N percent calculated: 3.96. Found: 3.88. Cl percent calculated: 10.01. Found: 10.07.

EXAMPLE 3

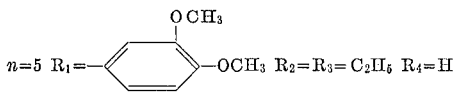

3,4-diethyl-2-(3,4 - dimethoxy-phenyl)-5-cyclohexylspiro-oxazolidine.

This is obtained from 7.4 g. of N-ethyl-1-(1-hydroxy-cyclohexyl)-propylamine and 20 g. of veratric aldehyde, in the presence of a few cg. of p-toluene sulfonic acid, in 100 ml. of toluene. After boiling for 24 hours, the solution is filtered and then evaporated to dryness under reduced pressure. The oily residue is taken up with a saturated ethereal HCl solution; the resulting hydrochloride solidifies after trituration with ether and is then recrystallized from isopropanol. Weight=6.8 g.

Cl percent calculated: 9.58. Found: 9.64. C percent calculated: 64.93. Found: 64.60. H percent calculated: 8.72. Found: 8.38.

EXAMPLE 4

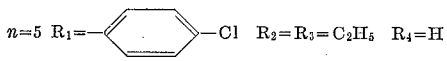

3,4-diethyl-2-p-chlorophenyl - 5 - cyclohexylspiro-oxazolidine.

This is prepared in the same manner as the product of Example 1, from N-ethyl - 1 - (1 - hydroxy-cyclohexyl)-propylamine and p-chlorobenzaldehyde in toluene, with removal of the water formed. After evaporation of the solvent, the residue is re-dissolved in ether and is then converted into the hydrochloride which is recrystallized from an isobutanol-ether mixture.

Calculated for $C_{18}H_{26}ClNOHCl$ (percent): C, 62.79; H, 7.91; Cl, 20.60; N, 4.07. Found (percent): C, 62.15; H, 8.26; Cl, 20.84; N, 3.98.

EXAMPLE 5

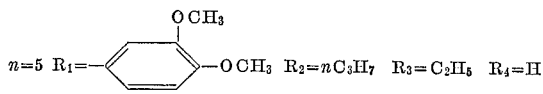

4-ethyl-3-n-propyl-2-(3,4-dimethoxy - phenyl) - 5 - cyclohexylspiro-oxazolidine.

This is prepared in the same manner as the product of Example 1, from N-n-propyl-1-(1-hydroxy-cyclohexyl)-propylamine and veratric aldehyde, in toluene, and with removal of the water formed. The desired product is extracted with dilute HCl, re-precipitated by alkylinization, extracted with ether, and is then converted into the hydrochloride which is recrystallized from an isopropanol-ether mixture.

Calculated for $C_{21}H_{33}NO_3HCl$ (percent): Cl, 9.23; N, 3.65. Found (percent): Cl, 9.20; N, 3.61.

EXAMPLE 6

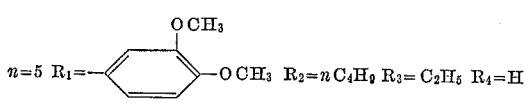

4 - ethyl-3-n-butyl-2-(3,4-dimethoxy-phenyl)-5-cyclohexyl-spiro-oxazolidine.

This is prepared in the same manner as the product of Example 1, from N-n-butyl - 1 - (1-hydroxycyclohexyl)-propylamine and veratric aldehyde, in toluene, and with removal of the water formed. The desired product is extracted with dilute HCl, re-precipitated by alkalinization, extracted with ether, and is then converted into the hydrochloride which is recrystallized from an isopropanol-pentane mixture.

Calculated for $C_{22}H_{35}NO_3HCl$ (percent): C, 66.39; H, 9.12; Cl, 8.91; N, 3.52. Found (percent): C, 65.95; H, 9.33; Cl, 8.95; N, 3.49.

EXAMPLE 7

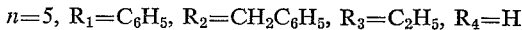

4-ethyl-2-phenyl-3-benzyl-5-cyclohexylspiro-oxazolidine.

This is obtained by heating and refluxing during 20 hours 12.3 g. of N-benzyl - 1 - (1 - hydroxy-cyclohexyl)-propylamine and 21.2 g. of benzaldehyde in 80 ml. of toluene, followed by filtration, evaporation of the solvent and treatment of the evaporation product of the solution with a saturated ethereal HCl solution. The resulting hydrochloride is suction filtered, and then washed with ether and dried in vacuo.

Weight: 12.2 g. N percent calculated: 3.77. Found: 3.71. Cl percent calculated: 9.52. Found: 9.83.

EXAMPLE 8

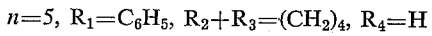

This is obtained in the same manner as the product of Example 1 by heating 8 g. of 1-(2-piperidyl)-cyclohexanol and 4.65 g. of benzaldehyde in 50 ml. of benzene. After evaporation of the solvent, the residue is taken up into ether and is extracted with 2.5 N HCl. The hydrochloride of the desired product is obtained by evaporation of the acidic aqueous solution and recrystallization from an isopropanol-ether mixture. Weight: 12 g. (89.5%). M.P.=234–6° C.

Cl percent calculated: 11.52. Found: 11.56. C percent calculated: 70.22. Found: 69.30. H percent calculated: 8.51. Found: 8.55.

EXAMPLE 9

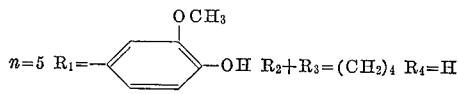

This is obtained in the same manner as the product of Example 1 from 8 g. of 1-(2-piperidyl)-cyclohexanol and 7.30 g. of vanillin in 50 ml. of benzene. The hydrochloride is recrystallized from a methanol-ether mixture. Weight: 11 g. (71%), M.P.: 250° C. (dec.).

Cl percent calculated: 10.01. Found: 10.09. C percent calculated: 64.48. Found: 64.54. H percent calculated: 7.97. Found: 8.03.

EXAMPLE 10

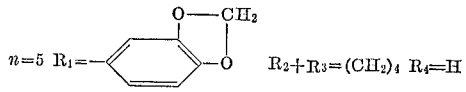

This is obtained in the same manner as the product of Example 1 from 5.5 g. of 1-(2-piperidyl)-cyclohexanol and 4.95 g. of piperonal in 70 ml. of toluene, in the presence of a few cg. of p-toluene sulfonic acid. The hydrochloride is recrystallized from an isopropanol-ether mixture. M.P. 228–230° C.

Cl percent calculated: 10.08. Found: 10.16. C percent calculated: 64.85. Found: 64.74. H percent calculated: 7.44. Found: 7.44.

EXAMPLE 11

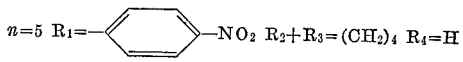

This is obtained in the same manner as the product of Example 1 from 9.15 g. of 1-(2-piperidyl)-cyclohexanol and 8.3 g. of p-nitrobenzaldehyde, in 80 ml. of benzene. The hydrochloride is recrystallized from an ethanol-ether mixture. Weight: 9.9 g. (55.8%); M.P.=235° C. (dec.).

Cl percent calculated: 10.05. Found: 10.13. C percent calculated: 61.26. Found: 60.60. H percent calculated: 7.14. Found: 7.21.

EXAMPLE 12

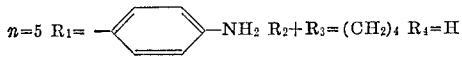

$n=5$ $R_1=$ —〈 〉—$NH_2$ $R_2+R_3=(CH_2)_4$ $R_4=H$ 2.8 g. of the nitro derivative described in Example 10, dissolved in 60 ml. of ethyl acetate, are hydrogenated under ordinary pressure, in the cold, in the presence of 0.3 of 5% palladium-over-charcoal. The product crystallizes on filtration and evaporation of the solvent. It is recrystallized from petroleum ether. Weight 2.2 g. (8.7%). M.P.: 95–98° C.

N percent calculated: 9.78. Found: 9.66. C percent calculated: 75.47. Found: 75.76. H percent calculated: 9.15. Found: 9.18.

The physical characteristics of a number of compounds I according to the invention are tabulated in Table I below.

TABLE I

| Ex. No. | $n$ | $R_1$ | $R_2$ | $R_3$ | $R_4$ | Physical constants |
|---|---|---|---|---|---|---|
| 13 | 5 | HO—〈 〉— | $C_2H_5$ | $C_2H_5$ | H | B.P./0.4=148°–149° C. |
| 14 | 5 | —〈 〉—OCH$_3$ (ortho) | $C_2H_5$ | $C_2H_5$ | H | Hydrochloride, M.P.=149° C. |
| 15 | 5 | —〈 〉—OC$_2$H$_5$ | $C_2H_5$ | $C_2H_5$ | H | Hydrochloride, dec. 166° C. |
| 16 | 5 | CH$_3$O—〈 〉—OCH$_3$ | $C_2H_5$ | $C_2H_5$ | H | Hydrochloride, M.P. (dec.) 170° C. |
| 17 | 5 | CH$_3$O, OCH$_3$ (disubst.) | $C_2H_5$ | $C_2H_5$ | H | Hydrochloride, M.P. (dec.) 172° C. |
| 18 | 5 | —〈 〉—N(C$_2$H$_5$)$_2$ | $C_2H_5$ | $C_2H_5$ | H | B.P./0.1=168–169° C. |
| 19 | 5 | (thienyl) | $C_2H_5$ | $C_2H_5$ | H | B.P./0.08=107° C. |
| 20 | 5 | (pyridyl) | $C_2H_5$ | $C_2H_5$ | H | B.P./0.05=128° C. |
| 21 | 5 | —〈 〉—(OCH$_3$)$_2$ | $C_2H_5$ | iC$_3$H$_7$ | H | B.P./0.5=169–170° C. |
| 22 | 5 | Same as above | $C_2H_5$ | CH$_3$ | CH$_3$ | B.P./0.3=168° C. |
| 23 | 5 | do | $C_2H_5$ | C$_6$H$_5$ | H | B.P./0.1=186–188° C. |
| 24 | 5 | do | $C_2H_5$ | —〈 〉—OCH$_3$ | H | Hydrochloride, M.P. (dec.) 146° C. |
| 25 | 4 | do | $C_2H_5$ | $C_2H_5$ | H | Hydrochloride, M.P. (dec.) 151° C. |
| 26 | 6 | do | $C_2H_5$ | $C_2H_5$ | H | B.P./0.3=179–180° C. |
| 27 | 5 | do | $C_2H_5$ | nC$_4$H$_9$ | H | B.P./0.2=170° C. |
| 28 | 5 | CH$_3$O—〈 〉— | $C_2H_5$ | $C_2H_5$ | H | Hydrochloride, M.P. (dec.) 168° C. |
| 29 | 5 | —〈 〉—OCH$_3$ | $C_2H_5$ | $C_2H_5$ | H | Hydrochloride, M.P. (dec.) 171° C. |
| 30 | 5 | CH$_3$O—〈 〉—OCH$_3$ | $C_2H_5$ | $C_2H_5$ | H | Hydrochloride, M.P. (dec.) 184° C. |
| 31 | 5 | CH$_2$—C$_6$H$_5$ | $C_2H_5$ | $C_2H_5$ | H | B.P./0.15=118–119° C. |

In order to demonstrate the coronary dilator activity of the compounds of the invention, the following experiments were carried out:

The percent increase of the coronary flow was determined in the isolated heart of a rabbit maintained by perfusion according to Langendorff's method (Arch. Ges. Physiol. 1895, 61, 291).

The products were administered by perfusion in Tyrode solution during 15 minutes. The flow was determined by means of the float flowmeter.

| Product described in the example | Concentration in the perfusion liquid, µg./ml. | Percent increase of coronary flow |
|---|---|---|
| Example: | | |
| 1 | 25 | 17 |
|   | 50 | 36 |
| 2 | 5 | 15 |
|   | 25 | 86 |
| 3 | 2 | 33 |
|   | 5 | 37 |
| 7 | 25 | 23 |
| 16 | 5 | 98 |
| 28 | 5 | 23 |
| 29 | 5 | 20 |
| 30 | 5 | 10 |

It is apparent from such tests that compounds I have an outstanding coronary dilator activity that makes them particularly valuable for the treatment of carido-vascular conditions such as myocardial infarction and angina pectoris.

For such applications, the drug containing compound I as active principle is formulated for administration by the parenteral (particularly intravenous) route, and by the oral route at the dosage of about 20 mg. to about 1 g. of active principle per 24 hours, the active principle being associated with the usual vehicles or excipients suitable for such routes of administration.

The drug may be formulated in unit dosage form, each unit dose containing about 10–200 mg. of active principle.

Having now described my invention, what I claim as new and desire to secure by Letters Patent is:

1. A compound selected from the group consisting of compounds of the formula:

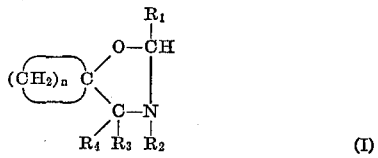

(I)

wherein $n$ is an integer from 4 to 6; $R_1$ is a member selected from the group consisting of benzyl, phenyl and phenyl substituted with a member selected from the group consisting of halogen, hydroxy, nitro, amino, lower alkylamino, diloweralkylamino, methylenedioxy, mono- and di-lower alkoxy; $R_4$ is a member selected from the group consisting of hydrogen and lower alkyl, and wherein (a) $R_2$, when taken separately, is a member selected from the group consisting of lower alkyl and benzyl, $R_3$, when taken separately, is a member selected from the group consisting of lower alkyl, phenyl and lower alkoxy phenyl and $R_2$ and $R_3$, when taken together with the carbon atom which carries $R_3$ and N, form a saturated cycle having 5 carbon atoms, and their acid addition salts.

2. A compound as claimed in claim 1, wherein $R_1$ is a substituted radical.

3. A compound as claimed in claim 2, wherein $R_1$ is a phenyl substituted with two methoxy groups.

4. A compound as claimed in claim 1, wherein $R_2$ is an alkyl radical.

5. A compound as claimed in claim 1, wherein $R_3$ is an alkyl radical.

6. A compound as claimed in claim 1, wherein $R_4$ is hydrogen.

7. 3,4 - diethyl - 2-(3,4-dimethoxy-phenyl)-5-cyclo-hexylspiro-oxazolidine.

8. 4 - ethyl - 3 - n-propyl-2-(3,4-dimethoxy-phenyl)-5-cyclohexylspiro-oxazolidine.

9. A compound as claimed in claim 1 wherein $R_1$ is 3,4-methylenedioxy-phenyl, $n$ is 5, $R_4$ is H, and $R_2+R_3$ is $(CH_2)_4$.

10. 3,4 - diethyl - 2 - (2,4-dimethoxy-phenyl)-5-cyclohexylspiro-oxazolidine.

11. 3,4 - diethyl - 2 - (4 - methoxy-phenyl) - 5 - cyclohexyl-spiro-oxazolidine.

References Cited

UNITED STATES PATENTS

| 1,915,334 | 6/1933 | Salzberg et al. | 260—243 |
| 2,075,359 | 3/1937 | Salzberg et al. | 424—250 |
| 2,243,295 | 5/1941 | Susie et al. | 260—307.6 |
| 2,629,740 | 2/1953 | Carnes | 260—307.6 |

HENRY R. JILES, Primary Examiner

S. D. WINTERS, Assistant Examiner

U.S. Cl. X.R.

260—307, 296, 326.5, 563, 570.9, 557; 424—267, 272